Patented Nov. 11, 1952

2,617,820

UNITED STATES PATENT OFFICE 2,617,820

ALKYL BENZYL TETRACHLOROPHTHALATES

Harry R. Gamrath, St. Louis, and William E. Weesner, Webster Groves, Mo., assignors to Monsanto Chemical Company, St. Louis, Mo., a corporation of Delaware No Drawing. Application May 13, 1950, Serial No. 161,901

18 Claims. (Cl. 260—475)

This invention relates to alkyl benzyl tetrachlorophthalates; more specifically, this invention relates to alkyl benzyl tetrachlorophthalates wherein the alkyl radical contains from 1 to 9 carbon atoms, and their method of preparation. This invention also relates to vinyl chloride polymers plasticized with alkyl benzyl tetrachlorophthalates wherein the alkyl substituent contains from 1 to 9 carbon atoms.

Some esters of tetrachlorophthalic acid have been disclosed in the art and various utilities ascribed to them. Of particular interest is the suggested use of these esters as plasticizers for various synthetic resins. As a group however the esters of tetrachlorophthalic acids heretofore known are not universally applicable or useful as plasticizers for synthetic resins, particularly those polymers or copolymers containing combined vinyl chloride. In the plasticization of synthetic resins, liquid plasticizers are preferred to solid plasticizers as liquid plasticizers are, as a general rule, more efficient than solid plasticizers and obviously easier to handle and process. Therefore, such esters as the dimethyl, diethyl, dicetyl and dibenzyl esters of tetrachlorophthalic acid, which are solids melting at 92° C., 60.5° C., 49–50° C. and 92–93° C. respectively, Beilstein, 9, 820, are not particularly desirable as plasticizers for synthetic resins. Furthermore, many of the esters of tetrachlorophthalic anhydride heretofore known are actually incompatible with resins which contain combined vinyl chloride. For example di(n-decyl) tetrachlorophthalate is incompatible with polyvinyl chloride, as shown in U. S. Patent 2,462,601. Similarly, it has been found that benzyl n-decyl tetrachlorophthalate is also incompatible with polyvinyl chloride at a 40% plasticizer concentration.

It is an object of this invention, therefore, to provide a new class of esters of tetrachlorophthalic acid.

It is a further object of this invention to provide a new class of esters of tetrachlorophthalic acid which esters are liquids at room temperature and are compatible with synthetic resins containing predominantly combined vinyl chloride.

A further object of this invention is to provide a process for the preparation of a new class of esters of tetrachlorophthalic acid.

A still further object of this invention is to provide synthetic resinous compositions comprising a vinyl chloride-containing polymer and a plasticizer therefor.

Further objects will become apparent from the description of the invention contained herein.

It has now been discovered that the alkyl benzyl tetrachlorophthalates wherein the alkyl substituent contains from 1 to 9 carbon atoms constitute an unusual class of tetrachlorophthalic acid esters. It has been found that these esters are extremely compatible with vinyl chloride-containing polymers permitting the preparation of plasticized vinyl chloride-containing resinous compositions having outstanding properties and performance characteristics. It has further been found that these alkyl benzyl tetrachlorophthalates are most unusual in that they are all liquids at room temperature. This characteristic is particularly surprising in view of the fact that the dimethyl, diethyl, dicetyl and dibenzyl esters of tetrachlorophthalic acid are solids having relatively high melting points.

The alkyl benzyl tetrachlorophthalates of this invention may be conveniently prepared by reacting an alkali metal salt of a monoalkyl tetrachlorophthalic acid, wherein the alkyl substituent contains from 1 to 9 carbon atoms, with benzyl chloride as illustrated in the following examples:

EXAMPLE I

Methyl benzyl tetrachlorophthalate

To a one-liter, round-bottom, three-necked flask provided with an agitator, a thermometer and a reflux condenser were charged, 318 g. of dry methanol and 143.0 g. of tetrachlorophthalic anhydride. The mass was heated by means of a glycerin bath to the reflux temperature until the formation of the half-ester, monomethyl tetrachlorophthalate was essentially complete. Next the mass was cooled to slightly below the reflux temperature (60–65° C.) and 36.1 g. of solid, anhydrous potassium carbonate was then added during the course of about one hour. To the potassium methyl tetrachlorophthalate were added 63.3 g. of benzyl chloride and 2 cc. of dimethylcyclohexylamine. The mass was next heated and the excess methanol was distilled from the reaction mass until about 217 g. of methanol was removed. Thereafter, the mass was refluxed (70–72° C.) for about 16 hours.

The crude methyl benzyl tetrachlorophthalate was purified by distilling off the excess solvents to a mass temperature of 135° C. Then the residue in the still was cooled and treated with 250 cc. of water to dissolve the potassium chloride. This salt solution-ester mixture was made alkaline to phenolphthalein paper with sodium carbonate. After separating the aqueous phase, the ester was steamed at 103–105° C. until about 500 cc. of distillate was collected. Thereafter, the ester was cooled, washed once with dilute aqueous alkali, twice with water and finally dried by heating under reduced pressure. From the reactants listed, 120.4 g. of methyl benzyl tetrachlorophthalate was obtained.

PROPERTIES

Sp. Gr. at 25°/25° C_____ 1.4678
$N_D^{25}$ _____ 1.5880
Pour point _____ +40° F.

EXAMPLE II

3,5,5-trimethylhexyl benzyl tetrachlorophthalate

To a reactor system as described in Example I were charged 79.5 g. of 3,5,5-trimethylhexyl alcohol and 143.0 g. of tetrachlorophthalic anhydride. The mixture was stirred and heated until the formation of the half-ester, mononyl tetrachlorophthalate was essentially complete. For the formation of the half-ester, the mass was held at about 135–140° C. for approximately two hours. Then the half-ester was cooled to 110–115° C. and 63.3 g. of benzyl chloride was added in about five minutes. With the mass temperature in the range of 95–100° C., and during the course of about 30 minutes, 35.1 g. of solid, anhydrous potassium carbonate (assay 98.6%) was charged. Then the mixture was heated at about 125–130° C. for approximately 18 hours. Agitation of the mass was continuous throughout all operations.

Crude 3,5,5-trimethylhexyl benzyl tetrachlorophthalate was purified by a technique similar to that described in Example I. The purified, dried nonyl benzyl tetrachlorophthalate weighed 141.3 g.

PROPERTIES

Sp. Gr. at 25°/25° C_____ 1.2308
$N_D^{25}$ _____ 1.5408
Pour point _____ +15° F.

EXAMPLE III n-Butyl benzyl tetrachlorophthalate

In accordance with the procedure described in Example II, 182.7 g. of n-butyl benzyl tetrachlorophthalate was obtained utilizing the following reactants:

143.0 g. tetrachlorophthalic anhydride
40.7 g. anhydrous n-butanol
63.3 g. benzyl chloride
34.8 g. anhydrous potassium carbonate n-Butyl benzyl tetrachlorophthalate thus obtained had the following properties:

Sp. Gr. at 25°/25° C_____ 1.3849
$N_D^{25}$ _____ 1.5728
Pour point _____ +20° F.

EXAMPLE IV

2-ethylhexyl benzyl tetrachlorophthalate

In accordance with the procedure described in Example II, 2-ethylhexyl benzyl tetrachlorophthalate was obtained utilizing the following reactants:

143.0 g. tetrachlorophthalic anhydride
71.5 g. 2-ethylhexanol
63.3 g. benzyl chloride
34.7 g. anhydrous potassium carbonate 2-ethylhexyl benzyl tetrachlorophthalate thus obtained had the following properties:

Sp. Gr. at 25°/25° C_____ 1.2771
$N_D^{25}$ _____ 1.5500
Pour point _____ +10° F.

EXAMPLE V

6-methylheptyl benzyl tetrachlorophthalate

In accordance with the procedure described in Example II, 185.9 g. of 6-methylheptyl benzyl tetrachlorophthalate was obtained utilizing the following reactants:

143.0 g. tetrachlorophthalic anhydride
71.6 g. 6-methylheptanol
63.3 g. benzyl chloride
34.8 g. anhydrous potassium carbonate
2 cc. dimethyl cyclohexylamine 6-methylheptyl benzyl tetrachlorophthalate thus obtained had the following properties:

Sp. Gr. at 25°/25° C_____ 1.2808
$N_D^{25}$ _____ 1.5507
Pour point _____ +15° F.

In addition to the alkyl benzyl tetrachlorophthalates prepared in the preceding five examples, the following alkyl benzyl tetrachlorophthalates are further illustrations of esters included within the scope of this invention:

Ethyl benzyl tetrachlorophthalate
Propyl benzyl tetrachlorophthalate
Isopropyl benzyl tetrachlorophthalate
Sec. butyl benzyl tetrachlorophthalate
Isobutyl benzyl tetrachlorophthalate
Tert. butyl benzyl tetrachlorophthalate
Amyl benzyl tetrachlorophthalate
Isoamyl benzyl tetrachlorophthalate
Hexyl benzyl tetrachlorophthalate
2-ethylbutyl benzyl tetrachlorophthalate
2-methylpentyl benzyl tetrachlorophthalate
Heptyl benzyl tetrachlorophthalate
Octyl benzyl tetrachlorophthalate
Capryl benzyl tetrachlorophthalate
Nonyl benzyl tetrachlorophthalate While specific reactants, quantities of reactants and reaction conditions have been set forth in the preceding examples, the process for the preparation of the novel compounds of this invention is subject to substantial variation. The monoalkyl ester of tetrachlorophthalic acid may be prepared in any manner well known to those skilled in the art. Preferably, it is obtained by reacting at least a one molecular proportion of an alkyl alcohol containing from 1 to 9 carbon atoms with a one molecular proportion of tetrachlorophthalic anhydride. This reaction is best carried out at an elevated temperature, as for example, in the range of from about 50–175° C. Preferably, it is carried out by boiling the reaction mixture under reflux conditions for the lower alkyl alcohols and in the temperature range of 125–150° C. for higher alkyl alcohols.

The alkali metal salt of the monoalkyl ester of tetrachlorophthalic acid may also be prepared by any of the methods well known to those skilled in the art. Preferably, it is prepared by reacting approximately a 0.5 molecular proportion of an alkali metal carbonate, such as sodium or potassium carbonate, with a one molecular proportion of the monoalkyl ester of tetrachlorophthalic acid. Inasmuch as practically all of the alkali metal salts of monoalkyl tetrachlorophthalates are solids, the reaction is best carried out in the presence of an inert solvent. If a considerable excess of alcohol has been used in the preparation of the alkyl tetrachlorophthalic acid, the excess alcohol may be utilized as the solvent. In such an instance, the alkali metal carbonate is reacted with the monoalkyl ester of tetrachlorophthalic acid in the excess alcohol and benzyl chloride subsequently added to the reaction mixture in order to carry out the last step of the reaction. If approximately equimolecular proportions of the alcohol and tetrachlorophthalic anhydride are used in the preparation of the monoalkyl ester of tetrachlorophthalic acid, the alkali metal carbonate and the benzyl chloride may be added simultaneously to the monoalkyl ester of tetrachlorophthalic acid in which case the benzyl chloride and the resultant liquid alkyl benzyl ester of tetrachlorophthalic acid serve as a liquid reaction medium.

The reaction between the alkali metal salt of the monoalkyl ester of tetrachlorophthalic anhydride and benzyl chloride is best carried out utilizing approximately equimolecular proportions of the reactants. The temperature of the reaction may be maintained over a wide range, preferably in the range of from about 70° C. to about 175° C. If desired, in order to speed the reaction, a catalyst may be employed. Typical of such catalysts are dimethylcyclohexylamine, triethylamine, or tertiary amines in general. In place of benzyl chloride in this step of the process for preparing the novel alkyl benzyl tetrachlorophthalates of this invention, any of the benzyl halides, such as benzyl bromide, benzyl iodide or benzyl fluoride may be utilized.

After the reaction is complete, the alkyl benzyl tetrachlorophthalate may be recovered from the reaction mixture by any of the methods well known to those skilled in the art of the recovery and purification of esters of tetrachlorophthalic acid.

Although the process for the preparation of the alkyl benzyl tetrachlorophthalates just described is the preferred procedure because of the good yields and high quality of the esters obtained, these compounds can be produced by other methods. As examples, tetrachlorophthalic acid or tetrachlorophthalic anhydride may be reacted with a mixture of benzyl alcohol and an alkyl alcohol in the presence of an acid catalyst to form the neutral esters. Or, tetrachlorophthalic anhydride may be reacted with benzyl alcohol to form monobenzyl tetrachlorophthalate and this half-ester may then be reacted with an alkyl alcohol in the presence of an acid catalyst to form the neutral esters. However, in each of these methods the reaction will produce mixtures of esters, the three principal components being dialkyl tetrachlorophthalate, dibenzyl tetrachlorophthalate and alkyl benzyl tetrachlorophthalate. The alkyl benzyl tetrachlorophthalate can be recovered in pure form from the mixture by fractionation, but obviously, only in a relatively low yield.

The unusual and outstanding properties and characteristics of these alkyl benzyl tetrachlorophthalates permit the preparation of novel synthetic resinous compositions comprising a vinyl chloride-containing polymer and an alkyl benzyl tetrachlorophthalate, wherein the alkyl group contains from 1 to 9 carbon atoms, having outstanding properties and performance characteristics. Such plasticized synthetic resinous compositions have been found to possess good flexibility, extreme permanence, that is, retention of desirable physical properties even in the presence of adverse conditions such as heat, and improved fire retardancy. These outstanding characteristics are illustrated by the following examples, wherein the expression "parts" of ingredients is meant to be parts by weight:

EXAMPLE VI

A mixture containing 60 parts of polyvinyl chloride and 40 parts of methyl benzyl tetrachlorophthalate was milled on a roll mill maintained at a temperature of 325° F. for a period of five minutes to form a homogeneous composition. The resulting composition was pressed into the form of a sheet in a suitable mould under a pressure of 4,000 lbs. per square inch and at a temperature of 325° F. for two minutes.

The plasticized polyvinyl chloride sheet thus obtained was found to be transparent and quite flexible at room temperature. A portion of the sheet was heated for 24 hours in a Freas circulating air oven at 105° C. After such a heating period, it was found that only approximately 2.6% of the methyl benzyl tetrachlorophthalate in the plasticized sheet had been lost through volatilization. It was further found that this plasticized polyvinyl chloride sheet would not support combustion when held in the open flame of a Bunsen burner. A plasticized polyvinyl chloride sheet prepared in the manner similar to that described above but containing di(2-ethylhexyl) phthalate, a widely used polyvinyl chloride plasticizer, burned quite readily when held in the flame of a Bunsen burner.

EXAMPLE VII

Example VI was repeated except that the polyvinyl chloride was replaced by a copolymer of 90 parts vinyl chloride and 10 parts vinyl acetate. The resulting composition was found to have properties quite similar to those obtained on the composition prepared in Example VI.

EXAMPLE VIII

Example VI was repeated except that the polyvinyl chloride was replaced by a copolymer of 90 parts vinyl chloride and 10 parts vinylidene chloride. A tough transparent sheet was obtained characterized by good flexibility, excellent fire retardancy and permanence of plasticizer even under the influence of heat.

EXAMPLE IX

Example VI was repeated except that the polyvinyl chloride was replaced by a copolymer of 90 parts vinyl chloride and 10 parts diethyl maleate. The composition thus obtained was found to be extremely flexible, tough, transparent and relatively non-flammable. Its excellent physical properties were retained even after a prolonged heating period.

EXAMPLE X

Example VI was repeated except that the methyl benzyl tetrachlorophthalate was replaced by 6-methylheptyl benzyl tetrachlorophthalate. The composition thus obtained was found to possess a low temperature flexibility of 0° C. when determined in accordance with the method of Clash and Berg, as described in Ind. Eng. Chem. 34, 1218 (1942), a method well known to those skilled in the art of the evaluation of polyvinyl chloride resins. After 24 hours in a Freas circulating air oven at 105° C., only 2.6% of the plasticizer in the composition was lost, indicating excellent permanence of plasticizer. The composition was also found to be relatively non-flammable.

EXAMPLE XI

Example VI was repeated except that the methyl benzyl tetrachlorophthalate was replaced by butyl benzyl tetrachlorophthalate. The composition thus obtained was found to have a low temperature flexibility of 3.5° C. After 24 hours in a Freas circulating air oven at 105° C., only 2.4% of the plasticizer in the composition was lost. The composition was also found to be relatively non-flammable.

EXAMPLE XII

Example VI was repeated utilizing in place of the 40 parts of methyl benzyl tetrachlorophthalate, a mixture containing 10 parts of methyl benzyl tetrachlorophthalate and 30 parts of di(2-ethylhexyl) phthalate. The flammability of this composition was found to be significantly less than a composition containing 40 parts of di(2-ethylhexyl) phthalate in place of the above described mixture of di(2-ethylhexyl) phthalate and methyl benzyl tetrachlorophthalate.

EXAMPLE XIII

Example VI was repeated except that the 40 parts of methyl benzyl tetrachlorophthalate were replaced by 30 parts of 2-ethylhexyl benzyl tetrachlorophthalate. The composition thus obtained was found to be extremely flexible, tough, transparent and relatively non-flammable. Its excellent physical properties were retained even after a prolonged heating period.

EXAMPLE XIV

Example VI was repeated except that the 40 parts of methyl benzyl tetrachlorophthalate were replaced by 20 parts of 3,5,5-trimethylhexyl benzyl tetrachlorophthalate. A tough, transparent sheet was obtained characterized by good flexibility, excellent fire retardancy and permanence of the plasticizer even under the influence of heating.

The results set forth in Examples VI to XIV illustrate the outstanding properties of the synthetic resinous compositions prepared in accordance with this invention. The results clearly indicate that such compositions are characterized by extreme toughness, good flexibility, outstanding retention of physical properties even under adverse conditions and excellent fire retardancy. Because of this unusual combination of excellent properties, these resinous compositions may be used in the preparation of tough, flexible, plastic films which films will possess an exceptionally long life because of the retention of their desirable physical properties, and which films may be used with a greater degree of safety in view of the relative non-flammability of these films which substantially eliminates the fire hazard frequently accompanying the use of plastic films.

While Examples VI to XIV illustrate particular compositions comprised of a vinyl chloride-containing resin and an alkyl benzyl tetrachlorophthalate, it is obvious that substantial variation is possible in the preparation and composition of such resinous compositions. Thus, the quantity of the alkyl benzyl tetrachlorophthalate utilized in such a composition may vary over a wide range depending upon the properties desired. An alkyl benzyl tetrachlorophthalate content of as low as about 5 parts by weight per 100 parts of the vinyl chloride-containing polymer and as high as 100 parts by weight of the alkyl benzyl tetrachlorophthalate per 100 parts of the vinyl chloride-containing polymer has been found to be useful in preparing improved plasticized synthetic resinous compositions. Furthermore, the alkyl benzyl tetrachlorophthalate may be utilized as the sole plasticizer for the vinyl chloride-containing polymer or it may be used in combination with one or more of the commonly used plasticizers for vinyl chloride-containing polymers, thereby obtaining a composition having physical properties attributable to, or resulting from, each of the plasticizer components. Typical of such plasticizers which may be utilized in combination with these alkyl benzyl tetrachlorophthalates are di(2-ethylhexyl) phthalate, dibutyl phthalate, tricresyl phosphate, alkyl diaryl phosphates, tri(2-ethylhexyl) phosphate, dibutyl sebacate, alkyl benzyl phthalates, etc.

The novel synthetic resinous compositions of this invention may also have incorporated therein various pigments, fillers, stabilizers, both heat and light, etc.

As indicated by the examples, copolymers of vinyl chloride and other unsaturated materials copolymerizable therewith may be plasticized with the alkyl benzyl tetrachlorophthalates in accordance with this invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chloro-styrene, para-chlorostyrene, 2,5-dichlorostyrene, 2,4-dichlorostyrene, para-ethyl styrene, divinyl benzene, vinyl naphthalate, alpha-methyl styrene; dienes, such as butadiene, chloroprene; amides, such as acrylic acid amide, acrylic acid anilide; nitriles, such as acrylic acid nitrile; esters of alpha, beta-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly preferred embodiment of the invention comprises compositions comprised of an alkyl benzyl tetrachlorophthalate of this invention and a polymer prepared by copolymerizing vinyl chloride and an ester of an alpha-beta-unsaturated dicarboxylic acid, such as diethyl maleate, in which 5 to 20 parts by weight of diethyl maleate are utilized for every 95 to 80 parts by weight of vinyl chloride. Among the preferred esters of alpha, beta-unsaturated dicarboxylic acids are the alkyl esters in which the alkyl group contains from 1 to 8 carbon atoms.

Compositions comprising a vinyl chloride-containing polymer and an alkly benzyl tetrachlorophthalate wherein the alkyl group contains from 1 to 9 carbon atoms, as disclosed herein, are claimed in our copending application Serial No.

161,902, filed May 13, 1950, and now United States Patent No. 2,588,512 issued March 11, 1952.

What is claimed is:

1. As new chemical compounds, the alkyl benzyl tetrachlorophthalates wherein the alkyl group contains from 1 to 9 carbon atoms.
2. Methyl benzyl tetrachlorophthalate.
3. Butyl benzyl tetrachlorophthalate.
4. Octyl benzyl tetrachlorophthalate.
5. 6-methylheptyl benzyl tetrachlorophthalate.
6. 2-ethylhexyl benzyl tetrachlorophthalate.
7. Nonyl benzyl tetrachlorophthalate.
8. 3,5,5 - trimethylhexyl benzyl tetrachlorophthalate.
9. A process of preparing alkyl benzyl tetrachlorophthalates, wherein the alkyl group contains from 1 to 9 carbon atoms, which comprises reacting an alkali metal salt of a monoalkyl ester of tetrachlorophthalic acid wherein the alkyl group contains from 1 to 9 carbon atoms, with a benzyl halide.
10. A process of preparing methyl benzyl tetrachlorophthalate, which comprises reacting an alkali metal salt of mono-methyl tetrachlorophthalate with benzyl chloride.
11. A process of preparing butyl benzyl tetrachlorophthalate, which comprises reacting an alkali metal salt of mono-butyl tetrachlorophthalate with benzyl chloride.
12. A process of preparing octyl benzyl tetrachlorophthalate, which comprises reacting an alkali metal salt of mono-octyl tetrachlorophthalate with benzyl chloride.
13. A process of preparing 6-methylheptyl benzyl tetrachlorophthalate, which comprises reacting an alkali metal salt of mono-6-methylheptyl tetrachlorophthalate with benzyl chloride.
14. A process of preparing 2-ethylhexyl benzyl tetrachlorophthalate, which comprises reacting an alkali metal salt of mono-2-ethylhexyl tetrachlorophthalate with benzyl chloride.
15. A process of preparing nonyl benzyl tetrachlorophthalate, which comprises reacting an alkali metal salt of mono-nonyl tetrachlorophthalate with benzyl chloride.
16. A process of preparing 3,5,5-trimethylhexyl benzyl tetrachlorophthalate, which comprises reacting an alkali metal salt of mono-3,5,5-trimethylhexyl tetrachlorophthalate with benzyl chloride.
17. A process of preparing alkyl benzyl tetrachlorophthalates, wherein the alkyl group contains from 1 to 9 carbon atoms, which comprises reacting an alkyl alcohol containing from 1 to 9 carbon atoms with tetrachlorophthalic anhydride to form the monoalkyl ester of tetrachlorophthalic acid, reacting the monoalkyl tetrachlorophthalate with an alkali metal carbonate to form the alkali metal salt of monoalkyl tetrachlorophthalate, and reacting the alkali metal salt of monoalkyl tetrachlorophthalate with a benzyl halide.
18. A process of preparing alkyl benzyl tetrachlorophthalates, wherein the alkyl group contains from 1 to 9 carbon atoms, which comprises reacting at least one molecular proportion of an alkyl alcohol containing from 1 to 9 carbon atoms with approximately a one molecular proportion of tetrachlorophthalic anhydride to form the monoalkyl ester of tetrachlorophthalic acid, reacting the monoalkyl tetrachlorophthalate thus formed with approximately a 0.5 molecular proportion of an alkali metal carbonate to form the alkali metal salt of monoalkyl tetrachlorophthalate, and reacting the alkali metal salt of monoalkyl tetrachlorophthalate thus formed with approximately a one molecular proportion of benzyl chloride.

HARRY R. GAMRATH.
WILLIAM E. WEESNER.

REFERENCES CITED

The following references are of record in the file of this patent:

UNITED STATES PATENTS

| Number | Name | Date |
|---|---|---|
| 1,700,960 | Van Schaack, Jr. | Feb. 5, 1929 |
| 2,460,574 | Gresham | Feb. 1, 1949 |
| 2,462,601 | Bohrer | Feb. 22, 1949 |

OTHER REFERENCES

Karrer, Organic Chemistry (1938 edition) page 188, Nordeman Publishing Co., Inc., New York.